United States Patent [19]

Bichel

[11] Patent Number: 5,106,641

[45] Date of Patent: Apr. 21, 1992

[54] APPARATUS AND METHOD FOR WATERLESS ROTARY CLEANING AND PEELING FOOD PRODUCTS AND THE LIKE

[76] Inventor: Ronald A. Bichel, 3141 Highway K South, Hartford, Wis. 53027

[21] Appl. No.: 690,047

[22] Filed: Apr. 23, 1991

[51] Int. Cl.⁵ .............................................. A23N 7/02
[52] U.S. Cl. ..................................... 426/483; 99/516; 99/623; 99/626; 99/629
[58] Field of Search ......... 99/516, 518, 519, 623–626, 99/629, 630; 15/3.2, 3.19; 426/482, 481, 483; 134/132

[56] References Cited

U.S. PATENT DOCUMENTS

| | | | |
|---|---|---|---|
| 3,134,413 | 5/1964 | Dorsa et al. | 99/627 |
| 3,437,116 | 4/1969 | Daugherty | 99/584 |
| 3,566,942 | 3/1971 | Smith | 99/625 |
| 3,602,280 | 8/1971 | Hill et al. | 99/625 |
| 3,811,000 | 5/1974 | Lazzarini | 426/483 |
| 3,854,395 | 12/1974 | Hirahara | 99/630 |
| 4,068,574 | 1/1978 | Amstad | 99/623 |
| 4,132,162 | 1/1971 | Magnuson | 99/630 |
| 4,237,782 | 12/1980 | Bichel | 15/3.2 |
| 4,519,305 | 5/1985 | Vanosdall | 99/625 |
| 4,827,836 | 5/1989 | Neidigh | 99/625 |

FOREIGN PATENT DOCUMENTS 2042822 9/1969 Fed. Rep. of Germany ........ 99/626
2602249 3/1971 Fed. Rep. of Germany ........ 99/626

Primary Examiner—Timothy F. Simone

[57] ABSTRACT

Apparatus for cleaning and peeling food products, such as fruits and vegetables, without the use of water, comprises a stationary housing in which a motor-driven brush cage is rotatably mounted. The cage comprises a plurality of cylindrical roller brushes radially arranged about a generally horizontal (but slightly downward slope) axis to define a generally cylindrical product-processing chamber. A rotatable product inlet tube at the chamber inlet end directs the product into the product chamber. A motor rotatably drives the inlet tube and the cage in one direction and, through a stationary ring gear and pinion gears on the brushes, causes each brush to rotate in the opposite direction. The inlet tube has vanes inside which impart initial rotary motion to the product entering the chamber. Product accumulating in the chamber forms a single layer against the wall of the chamber as it is advanced therethrough, making contact with substantially all the rotating brushes which effect cleaning and peeling. Waste materials are ejected between adjacent rollers into the housing and are expelled through a waste opening in the bottom of the housing, whereas the finished product exits the outlet end of the chamber. No water is used in processing the product, but the interior of the housing can be flushed with water to remove waste therefrom.

6 Claims, 6 Drawing Sheets

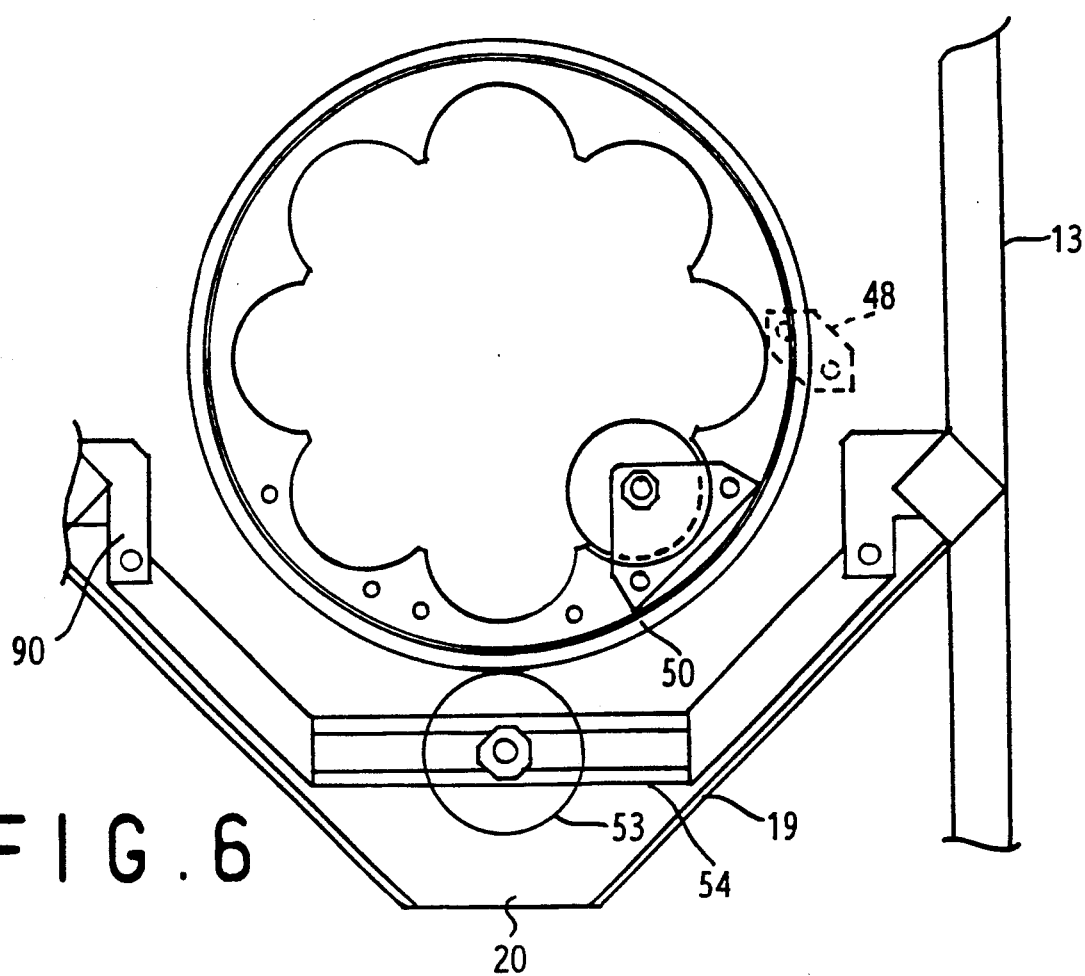
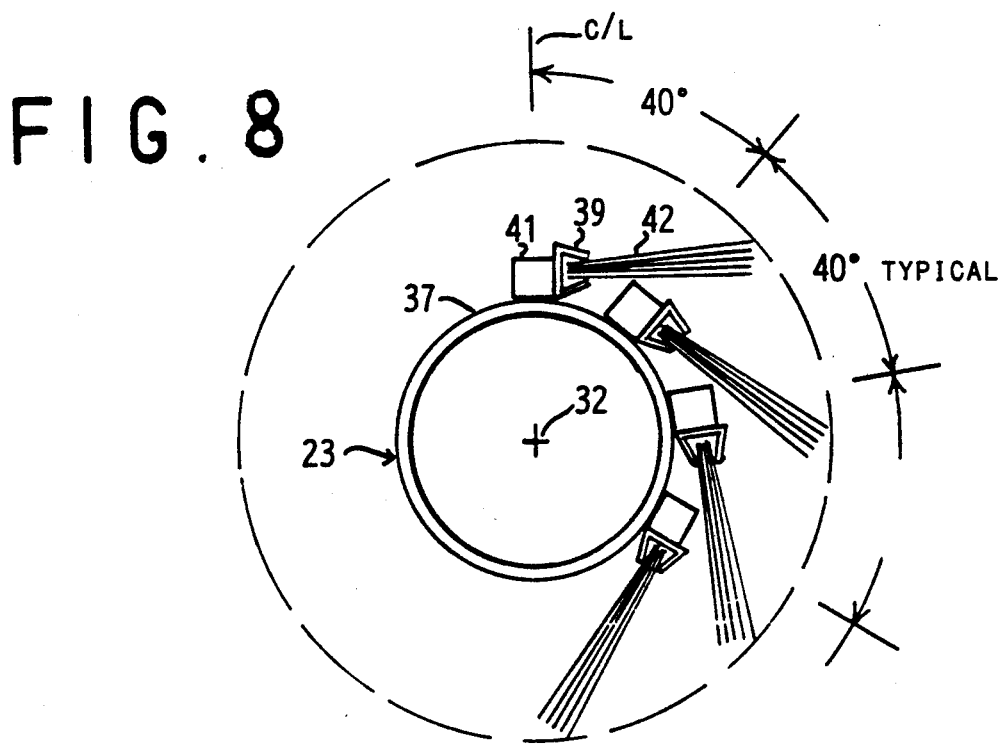

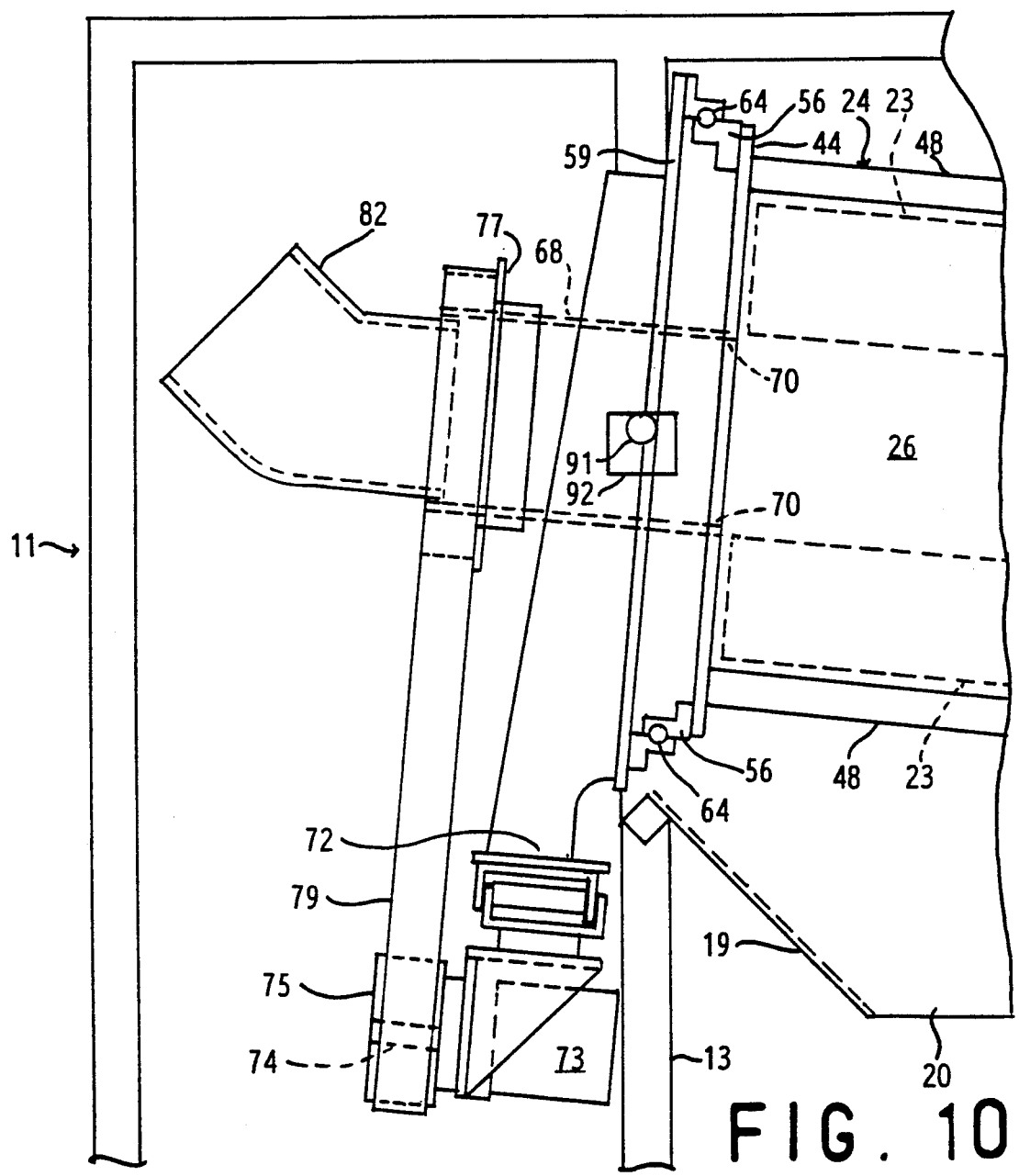
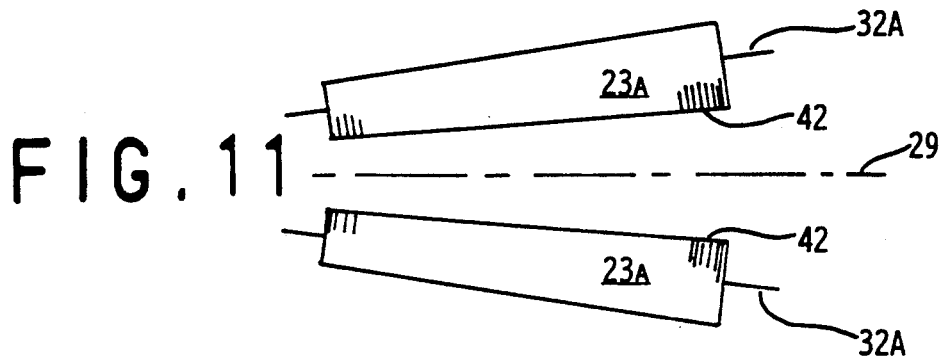
FIG. 10
FIG. 11

5,106,641

APPARATUS AND METHOD FOR WATERLESS ROTARY CLEANING AND PEELING FOOD PRODUCTS AND THE LIKE

BACKGROUND OF THE INVENTION

1. Field of Use

This invention relates to apparatus and method for waterless rotary cleaning and peeling food products and the like.

2. Description of the Prior Art

Prior art apparatus for cleaning and peeling fruit and vegetable products, such as potatoes, carrots, and the like, typically employs rotatable roller brushes in various arrangements to abrade the outer layer of skin from the product. The following U.S. Pat. Nos. illustrate the state of the art: 4,258,069; 4,230,034; 3,811,000 and 2,355,810.

In some prior art arrangements a plurality of rotatable roller brushes are arranged in radially spaced-apart relationship about a horizontal main axis to define a rotatable roller cage having a product-receiving chamber therewithin. Typically, a rotatable auger or other means within the chamber advances the product axially therethrough and forces the product to engage the roller brushes so that the brushes can clean and peel the product. Furthermore, water is injected or sprayed into the chamber and onto the product to enable or facilitate the cleaning and peeling process.

However, the use of such augers or similar devices reduces the volumetric capacity of the chamber and limits the amount of product that can be processed at a given time, can inflict physical damage on the product being processed thereby causing waste and adds to the cost and complexity of the apparatus. The use of water during processing can adversely affect the texture and moisture content of the finished product, can cause a sludge-like mixture of peelings and dirt to accumulate within the chamber and on the product which adversely affects the quality of the finished product and which can, in some cases, actually interfere with and inhibit the cleaning/peeling process. Therefore, it is desirable to provide an improved apparatus and method for cleaning and peeling such products.

SUMMARY OF THE PRESENT INVENTION

The present invention provides improved apparatus and method for using rotatable roller brushes to clean and peel products, such as fruits, vegetables, nuts, kernels and the like, without the need for augers or the like to move and direct the product against the roller brushes and without the use of water during processing.

The improved apparatus broadly comprises a plurality of rotatable roller brushes arranged to define a rotatable roller cage having a product-receiving chamber therewithin with a main axis which is sloped slightly downwardly from horizontal. Means are provided to rotate the roller cage in one direction and to rotate each roller brush in the opposite direction. Each roller brush comprises abrasive means such as elongated bristles which extend from the roller core. Preferably, the bristles have a coating of abrasive material on the sides thereof and extend tangentially from the surface of the roller core. Means are provided to adjust the slope of the main axis of the roller cage. Means are provided to feed the product into the relatively higher inlet end of the chamber and to impart rotational movement to the product as it is being fed into the chamber.

In accordance with the improved method, the rotational speed of the roller cage, the rate at which product is fed into the chamber and the initial rotational speed of the product entering the chamber are regulated, taking into account the size, shape and weight of the product, so that substantially only one layer of product is disposed against the majority of roller brushes defining the chamber.

In operation, the pieces of product entering the chamber are moving in the same rotary direction as the cage is rotating and are flung against the wall of the chamber defined by the contra-rotating brushes and are held thereagainst in a single layer by centrifugal force as the cage rotates, at the same time being acted upon by the abrasive bristles of the rotating roller brushes which clean and peel the product. The shape, disposition and direction of rotation of the bristles on the roller brushes cause the peelings to be flung outwardly of the chamber. The slope of the chamber causes the product to advance toward and exit through the outlet opening at the relatively lower end of the chamber. The amount of centrifugal force employed to keep a layer of product against the roller brushes is kept at a minimum so that, assuming that the highest point of cage rotation is at "12 o'clock", a piece of product can be raised to about the "11 o'clock" position before it falls or tumbles under the force of gravity to about the "1 o'clock" position. The product pieces tumble and rotate as they are engaged by the bristles and this ensures that all of the outer surface of each piece of product is cleaned and peeled by the time it passes through the chamber from the inlet end to the outlet end of the chamber.

The present invention provides several important advantages over the prior art. For example, the process is carried out without the use of water thereby producing a superior finished product and eliminating the need to clean and dry the finished product before further processing is carried out. Furthermore, the absences of water enables the apparatus to process a product which takes the form of relatively small pieces, such as kernel corn, nuts and the like. The absence of an auger or similar components within the chamber, besides reducing the cost and maintenance of the apparatus, enables better control of the feeding of product into the chamber, eliminates product damage caused by moving components in the chamber and enables more efficient processing of the product in the chamber. Other objects and advantages of the invention will hereinafter appear.

DESCRIPTION OF THE DRAWINGS

FIG. 6 is an enlarged end view of the brush support assembly at the outlet end of the apparatus;

FIG. 8 is a greatly enlarged end view of a portion of one of the brushes of the apparatus of FIG. 1;

FIG. 10 is a side elevation view of the brush support assembly at the inlet end of the apparatus shown in FIG. 9;

FIG. 11 shows an alternative brush arrangement.

DESCRIPTION OF PREFERRED EMBODIMENTS

General Arrangement

Figure 1:
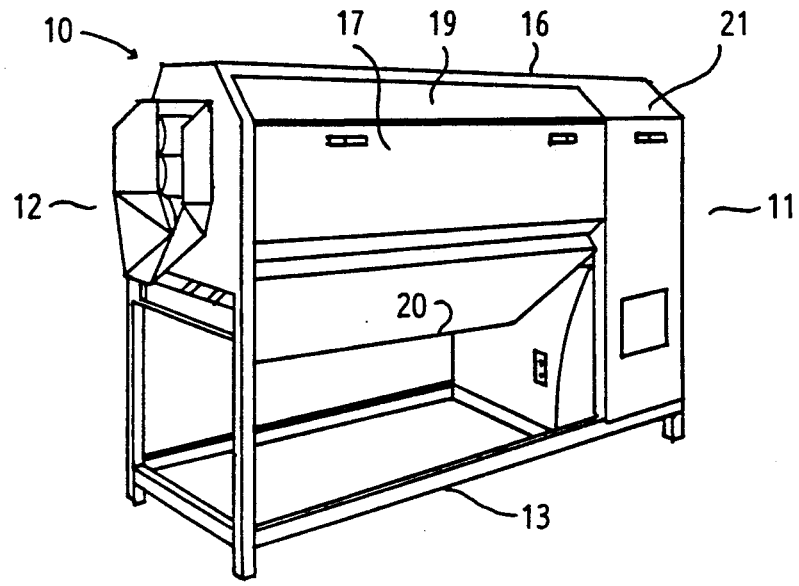
FIG. 1 is a perspective view taken from the outlet end and one side of apparatus in accordance with the invention.
Figure 4:
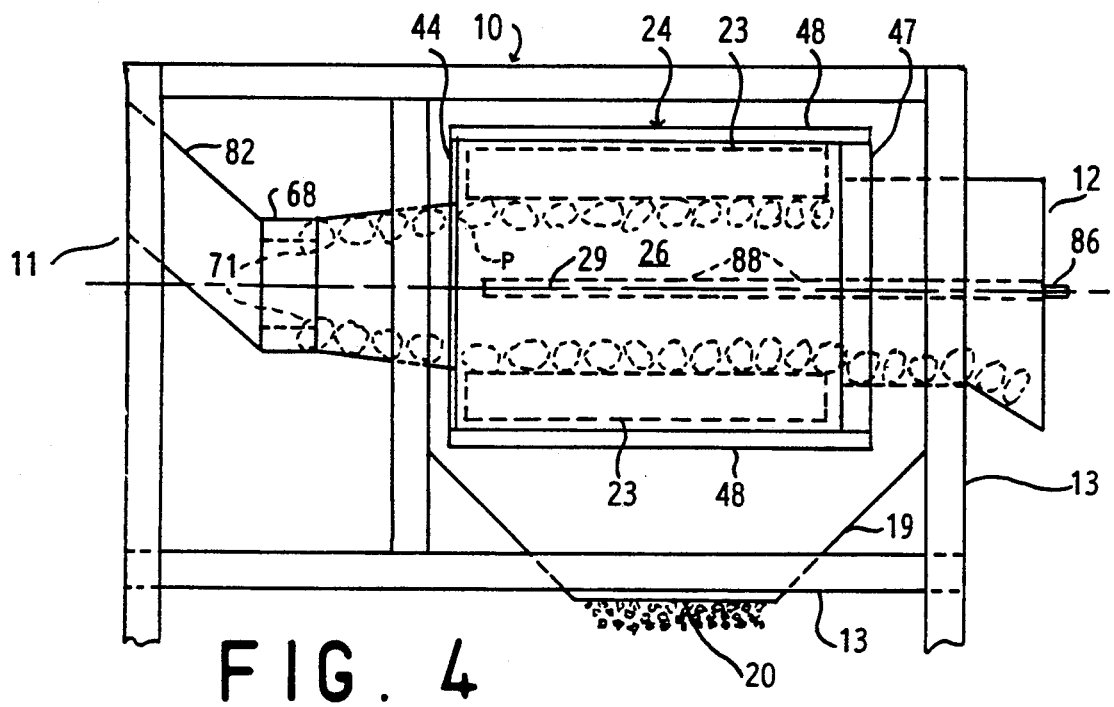
FIG. 4 is an enlarged schematic longitudinal cross-section view of the apparatus of FIG. 1.
Figure 5:
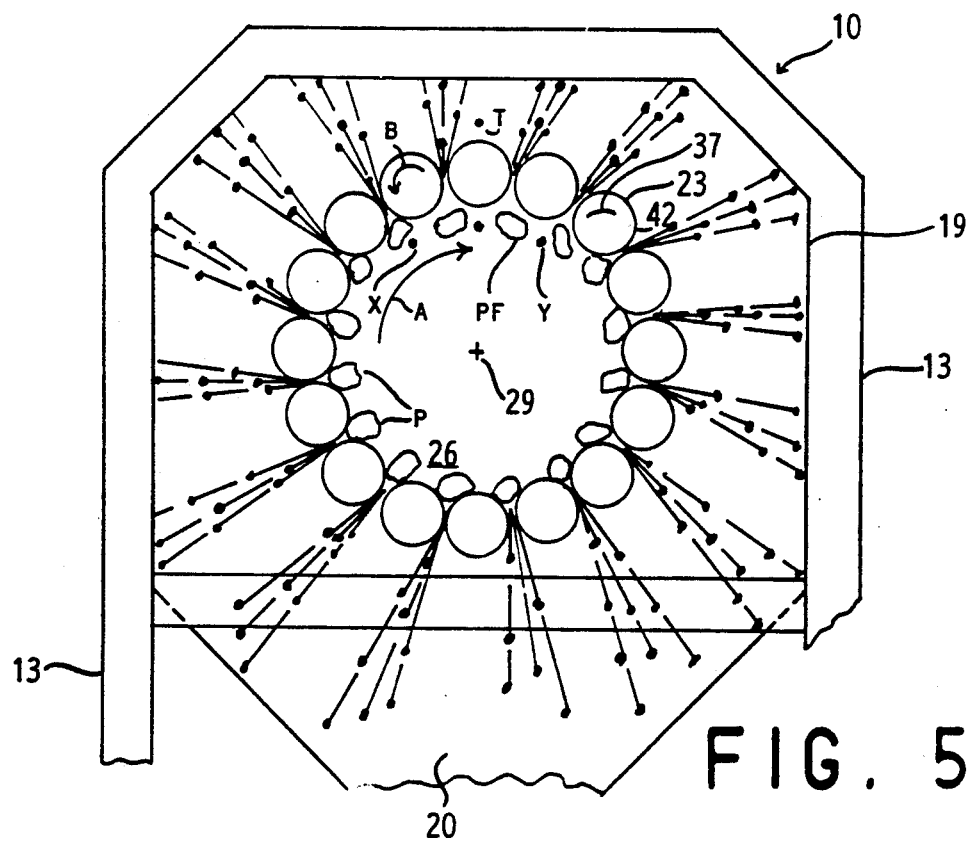
FIG. 5 is an enlarged schematic transverse cross-section view of the apparatus of FIG. 1.

Referring to FIGS. 1,4 and 5, the apparatus 10, which has an inlet end 11 and an outlet end 12, comprises a support frame 13, a stationary housing 16, including a brush housing 19 and a drive housing 21, and a rotatable brush cage 24. The brush housing 19 has an access door 17 on at least one side and a waste exit opening 20 at the bottom thereof. As FIGS. 4 and 5 show, the brush housing 19 encloses brush cage 24 which comprises a plurality of brushes 23 which are radially arranged to define a chamber 26 therewithin in which the product is processed. The brush cage 24 and chamber 26 have a main axis 29 which slopes slightly downwardly from horizontal (about 3° in FIGS. 7 and 10) from the inlet end 11 to the outlet end 12.

The number of roller brushes 23 in any specific machine can be varied to suit the nature of the product to be processed. FIGS. 2,3,6 and 9 depict eight brushes 23, whereas FIG. 5 depicts sixteen brushes 23, for example.

Figure 3:
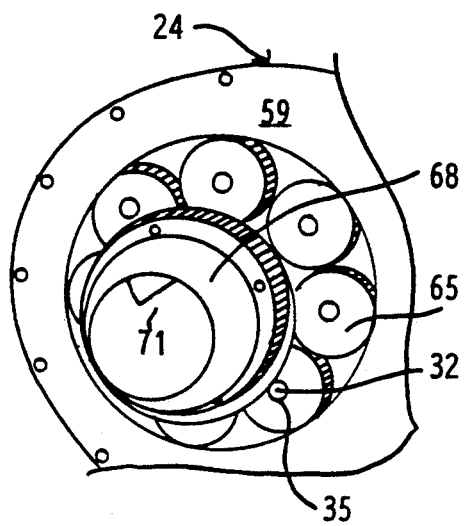
FIG. 3 is a more greatly enlarged perspective view, similar to FIG. 2, but showing the drive belt of the drive assembly removed.
Figure 9:
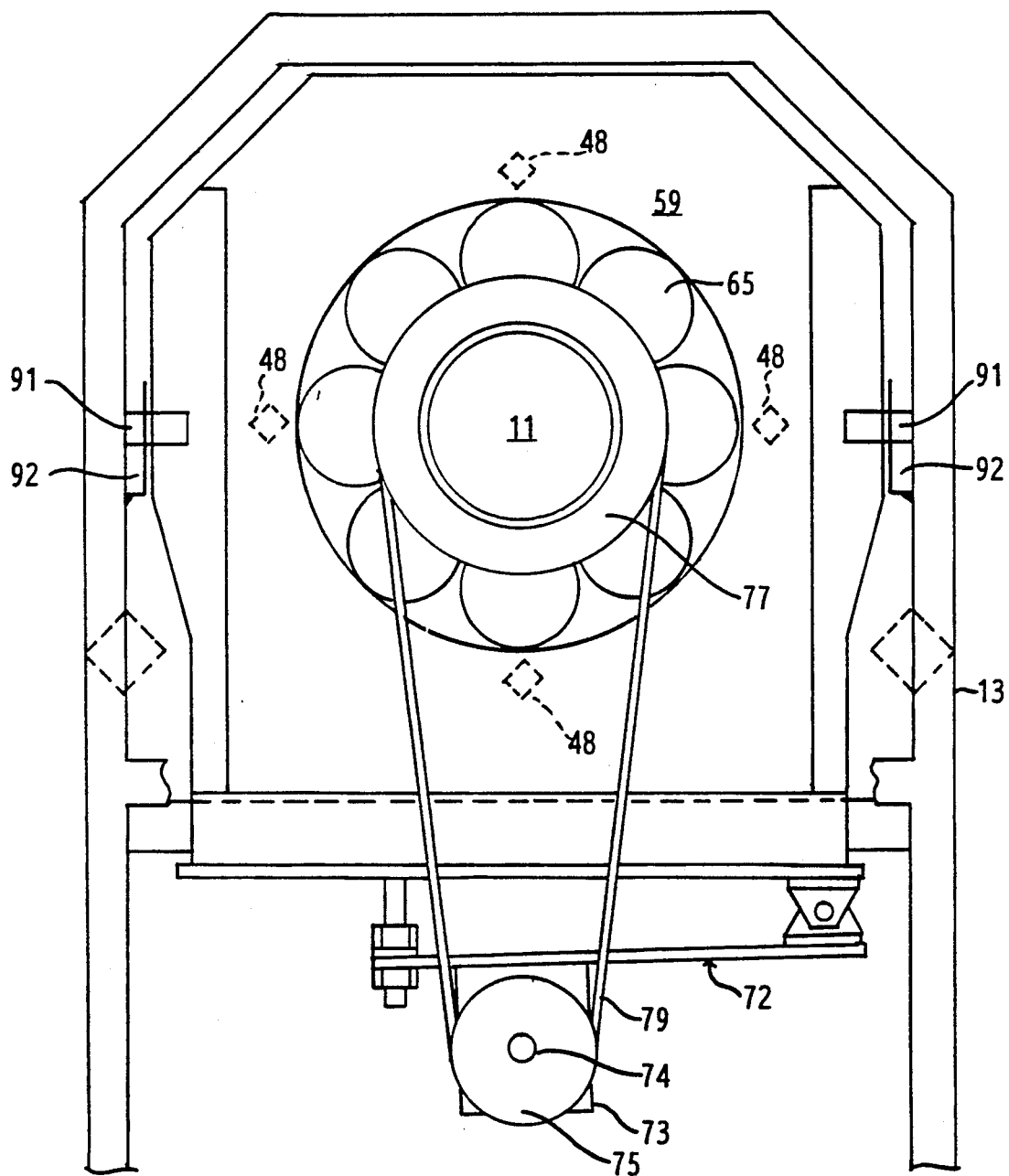
FIG. 9 is an end view of the brush support assembly and drive means at the inlet end of the apparatus.

Referring to FIGS. 3 and 9, each of the brushes 23 comprises a brush axle 35 (FIG. 3) with a brush axis 32 extending longitudinally therethrough, a brush core 37 affixed to the axle 35, and a plurality of bristle mounts 41 (nine, for example) affixed around and along the brush core 37 for receiving and securely holding the elongated bristle holders 39 in which the bristles 42, hereinafter described in detail, are mounted.

Figure 7:
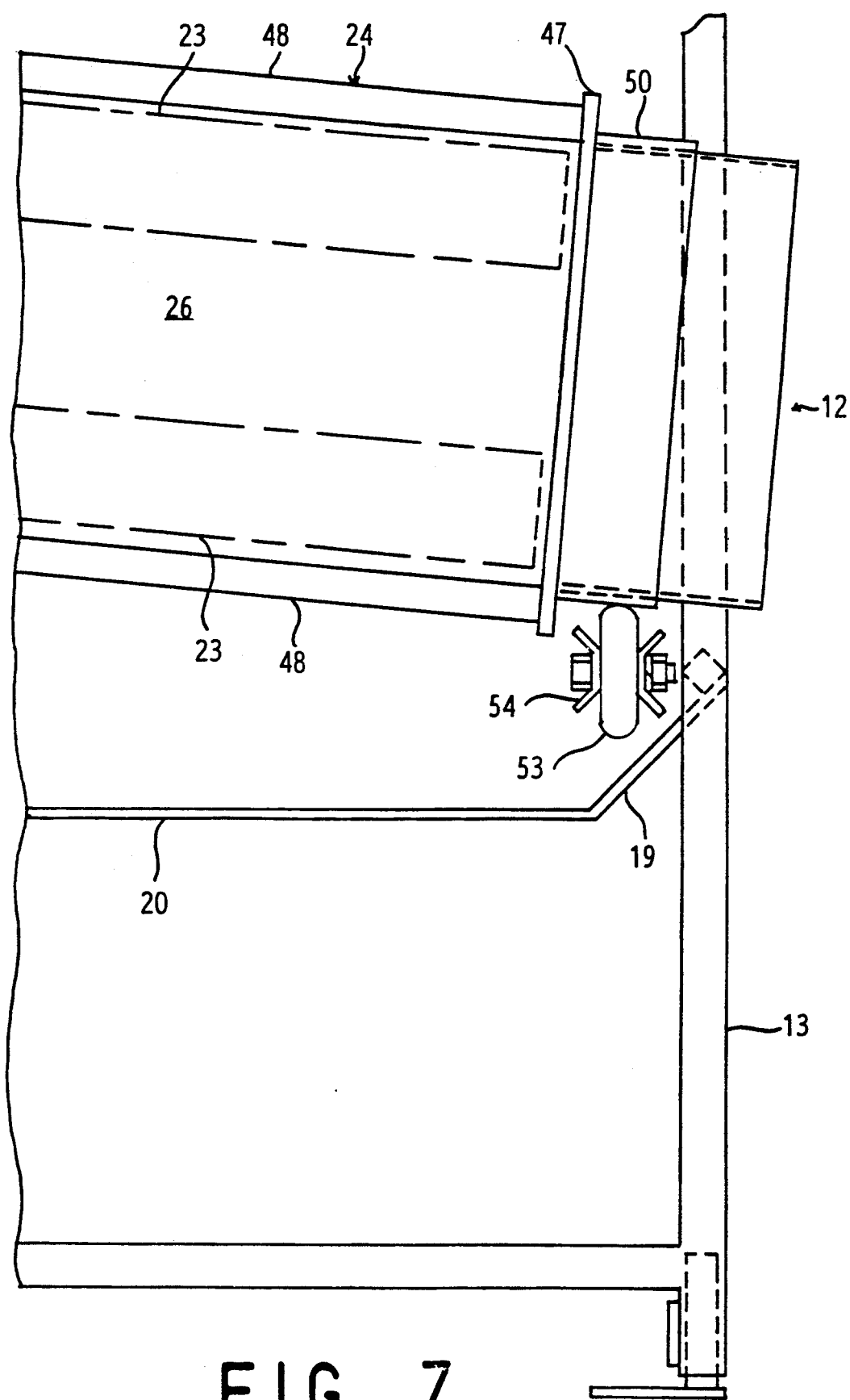
FIG. 7 is a side elevation view of the brush support assembly at the outlet end of the apparatus shown in FIG. 6.

Referring to FIGS. 4,7 and 10, brush cage 24 comprises a brush support ring 44 at the inlet end 11 and a brush support ring 47 at the outlet end 12 which are fixedly connected together in spaced-apart relationship by four rigid support rods 48 (se FIGS. 4,6,7,9 and 10). The brush cage 24 is rotatably supported on a ring gear 59 and on a support roller 53, both of which are ultimately supported on support frame 13.

More specifically, referring to FIGS. 6,7,9 and 10, the brushes 23 are rotatably supported at the inlet end 11 by rotatable brush support ring 44 and at the outlet end 12 by rotatable brush support ring 47. As FIGS. 6 and 7 show, the brush support ring 47 has a annular flange 50 affixed thereto which rides on a support roller 53 which is rotatably mounted on an adjustable bracket 54 on the support frame 13. As FIG. 10 shows, the brush support ring 44 has a annular flange 56 affixed thereto which rides on ball bearings 64 located between the brush support ring 44 and stationary ring gear 59 located at the inlet end 11 and non-rotatably (but tiltably) secured to the support frame 13. As FIGS. 2 and 3 show, each brush axle 35 has a pinion gear 65 fixedly mounted thereon at the inlet end 11 and the pinion gear 65 meshes with the internal teeth of ring gear 59.

Figure 2:
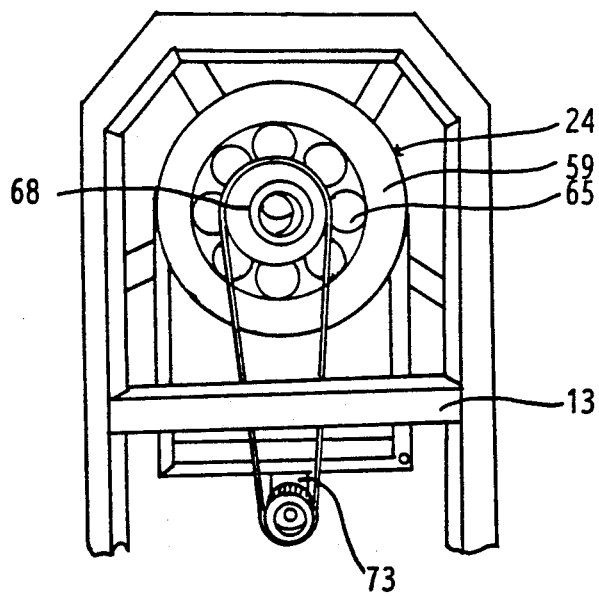
FIG. 2 is an enlarged perspective view of the drive assembly at the inlet end of the apparatus, with a portion of the housing removed to reveal interior details.

Referring to FIGS. 2,3,4,9 and 10, a rotatable product inlet tube 68 is welded at 70 to brush support ring 44 and has a plurality of vanes 71 therewithin which are radially spaced apart from one another and between which pieces of product can pass. As FIGS. 2,9 and 10 show, a drive motor 73 is mounted within drive housing 21 on a bracket assembly 72 connected to tiltable stationary ring gear 59 and has a motor drive shaft 74 with a motor drive pulley 74 thereon. As FIG. 9 makes clear, bracket assembly 72 allows motor 73 to be adjustably positioned to tighten a belt 79. The endless flexible drive belt 79 is connected between motor drive pulley 75 and a driven pulley 77 affixed on product inlet tube 68. The drive motor 73 may be electric or hydraulic. A stationary product inlet tube 82 mounted on support frame 13 (or elsewhere) communicates with but is not attached to the rotatable product inlet tube 68 to introduce product thereto from a source (not shown).

Referring again to FIG. 8, each of the brushes 23 comprises a brush core 37 around which the plurality of bristle mounts 41 are arranged in radially spaced apart relationship. Each bristle mount 41 extends the length of the 37. Each bristle mount 41 receives and securely holds one bristle holder 39. Each bristle holder 39 supports a plurality of bristles 42 and, in the preferred arrangement disclosed herein, each of the bristles 42 is formed and positioned so that it extends outwardly at a tangent to the outer surface of the brush core 37. Each bristle 42, which is formed of a slightly flexible resilient material, such as metal or plastic, may be provided along its sides with an abrasive coating formed of abrasive particles (not shown) embedded in a solidified plastic adhesive (not shown).

As FIG. 4 shows, the apparatus 10 includes a rinse water inlet pipe 86 having outwardly-directed rinse water nozzles or hole 88 at intervals therealong. The pipe 86 is rigidly secured to support frame 13 by suitable means (not shown) and extends axially through chamber 26 so as not to interfere with the mechanism or product. The purpose of rinse water inlet pipe 86 and the rinse water nozzles or holes 88 is to supply water under pressure from a source (not shown) to flush debris and peelings outwardly from the brushes 23 toward housing 19 and to rinse the brush housing 19 after the product has been processed. However, no water is expelled from the rinse water nozzles 88 while the product is being processed or while the product is in the chamber 26.

FIG. 11 shows another alternate brush arrangement which is within the scope of the present invention and wherein the brushes 23A have a conical rather than a cylindrical configuration and have their axes 32A divergent to main axis 29 rather than parallel to main axis 29. However, the chamber 26, which is shown as slightly conical, could be cylindrical. The advantage of the arrangement in FIG. 11 is that the longer bristles 42 travel at a greater peripheral speed than the shorter ones and this can be advantageous in processing a product which requires a range of abrasive action. Either end of the chamber 26 could serve as the inlet end 11, depending on the product being processed and the results desired.

Operation and Method

In operation, referring to FIGS. 4,5 and 10, motor drive shaft 74 is energized to effect rotation of brush cage 24 clockwise in the direction of arrow A (FIG. 5) and to effect rotation of each of the brushes 23 counterclockwise in the direction of arrow B (FIG. 5). A product to be cleaned and peeled (i.e., processed), such as potatoes P, is introduced through stationary product inlet tube 82 into rotatable product inlet tube 68 wherein the vanes 71 impart rotary motion to the pieces of product as they enter chamber 26. Taking into account the size, shape, nature, texture and weight of the product to be processed (compare, for example, potatoes, carrots, nuts, kernels of corn), the operator of apparatus 10 controls, regulates or sets the rotational speed of drive motor 73 and brush cage 24 and controls the rate of feed of product to stationary product inlet tube 82 so that in so far as possible only one layer of product (FIGS. 4 and 5) is exposed to the rotating brushes 23 and so that each piece of product in the layer is forced against the brushes 23 defining the chamber 26 by centrifugal force. The appropriate amount of centrifugal force is applied (a function of rotational speed of cage 24) so that individual pieces are carried upward by the rotation of brush cage 24 to a point X (FIG. 5) which is about 30° below the top center point T (FIG.5) of the path of cage rotation (i.e., about "eleven o'clock" in FIG. 5). Gravity then causes the piece (see piece PF in FIG. 5) to fall downward but, since residual centrifugal force imparted to the piece also causes tangential movement of the piece across chamber 26, the piece again impinges on the brushes 23 at a point Y (FIG. 5) which is about 30° below the top center point of cage rotation (i.e., about "one o'clock" in FIG. 5) whereat it tends to cling as it is lowered and again raised to the first point X. Each piece of product in contact with the brushes 23 is rotated, tumbled and abraded by the bristles 42 of the brushes 23 with which the piece is in contact. When a piece makes simultaneous contact with two adjacent brushes 23, several surfaces of the piece are abraded simultaneously. The afore-described process is continued for the length of time necessary to fully clean and peel a particular product. The number, density, length, shape, tangential disposition and abrasive character of the bristles 42 are such that the bristles sweep across the product and these characteristics can be selected and combined to suit products of particular size, shape and texture.

Since chamber 26 slopes downward from horizontal (3° being shown in the drawings), the product proceeds from the inlet end 11 to the outlet end 12 as the brush cage 24 rotates. The greater the degree of slope, the greater the speed of advance. Provision is made to change the degree of slope. Thus, means including an adjustable bracket 90 (FIG. 6) are provided to raise or lower support roller 53 which supports the outlet end 12 of brush cage 24. As FIGS. 9 and 10 show, the stationary ring gear 59 is tiltably mounted on support frame 13 by means of brackets 92 on support frame 13 which receive pivot pins 91 on ring gear 59 to accommodate the adjustable movement of the support roller 53.

I claim:

1. Apparatus for abrading the outer surface of a product, such as a fruit or vegetable, to clean and peel the skin or husk therefrom without the use of water comprising:

a plurality of rotatable cylindrical brushes arranged in radially spaced-apart relationship about a main axis which slopes slightly downward from horizontal so as to define a rotatable roller cage having a generally cylindrical product-receiving chamber having a product inlet opening at its higher end and a finished product outlet opening at its opposite lower end, each brush having a core with an axis of rotation and abrasive means extending outwardly from said core;

means for feeding said product through said product inlet opening into said chamber while imparting rotational movement to said product prior to entry of said product into said chamber;

means to effect rotation of said roller cage about said main axis in one direction so that the rotational speed of said cage about said main axis and the rate of feeding said product into said chamber are regulated, taking into account the size and weight of said product, so that substantially only one layer of product is disposed against the majority of brushes defining said chamber;

and means to effect rotation of each brush about its said axis of rotation in a direction opposite to said one direction.

2. Apparatus according to claim 1 wherein said means for feeding said product impart rotational movement to said product in the said one direction in which said cage rotates.

3. Apparatus according to claim 1 wherein said abrasive means comprises bristles which are elongated and extend tangentially relative to said core and are provided with a coating of abrasive material.

4. Apparatus according to claim 3 wherein said means for feeding said product impart rotational movement to said product in the said one direction in which said cage rotates.

5. A method for abrading the outer surface of a product, such as a fruit or vegetable, to clean and peel the skin or husk therefrom without the use of water comprising the steps of:

providing a plurality of rotatable cylindrical brushes arranged in radially spaced-apart relationship about a main axis which slopes slightly downward from horizontal so as to define a roller cage having a generally cylindrical product-receiving chamber having a product inlet opening at its higher end and a finished product outlet opening at its opposite lower end, each brush having a core with an axis of rotation and abrasive means extending outwardly from said core;

feeding said product through said product inlet opening into said chamber while imparting rotational movement to said product prior to entry of said product into said chamber;

effecting rotation of said roller cage about said main axis in one direction so that the rotational speed of said cage about said main axis and the rate of feeding said product into said chamber are regulated, taking into account the size and weight of said product, so that substantially only one layer of product is disposed against the majority of brushes defining said chamber;

and effecting rotation of each brush about its said axis of rotation in a direction opposite to said one direction.

6. A method according to claim 5 wherein said abrasive means comprises bristles which are elongated and extend tangentially relative to said core and are provided with a coating of abrasive material so that sides of the bristles scrape against the outer surface of the product.

* * * * *